(12) United States Patent
Ulemek et al.

(10) Patent No.: US 11,104,049 B2
(45) Date of Patent: Aug. 31, 2021

(54) CHANNEL GEOMETRY FOR PROMOTING AT LEAST ONE OF A UNIFORM VELOCITY PROFILE AND A UNIFORM TEMPERATURE PROFILE FOR AN ANNULAR OR PART-ANNULAR MELT FLOW

(71) Applicant: HUSKY INJECTION MOLDING SYSTEMS LTD., Bolton (CA)

(72) Inventors: Adam Christopher Ulemek, Mississauga (CA); Stephen Daniel Ferenc, Bolton (CA); Maciej Brelski, Brampton (CA); Wesley Grove, Essex Junction, VT (US)

(73) Assignee: Husky Injection Molding Systems Ltd., Bolton (CA)

( * ) Notice: Subject to any disclaimer, the term of this patent is extended or adjusted under 35 U.S.C. 154(b) by 88 days.

(21) Appl. No.: 16/347,370

(22) PCT Filed: Nov. 8, 2017

(86) PCT No.: PCT/CA2017/051327
§ 371 (c)(1),
(2) Date: May 3, 2019

(87) PCT Pub. No.: WO2018/098563
PCT Pub. Date: Jun. 7, 2018

(65) Prior Publication Data
US 2020/0262121 A1    Aug. 20, 2020

Related U.S. Application Data

(60) Provisional application No. 62/428,585, filed on Dec. 1, 2016.

(51) Int. Cl.
*B29C 45/30* (2006.01)
*B29C 45/27* (2006.01)

(52) U.S. Cl.
CPC .......... *B29C 45/30* (2013.01); *B29C 45/2725* (2013.01); *B29K 2995/0097* (2013.01)

(58) Field of Classification Search
CPC ........ B29C 48/305; B29C 2948/92904; B29C 45/278
(Continued)

(56) References Cited

U.S. PATENT DOCUMENTS 2,425,237 A * 8/1947 Field ...................... B29C 48/475
                                                                    425/466
3,090,994 A    5/1963 Stenger
(Continued)

FOREIGN PATENT DOCUMENTS

WO          03064134 A1    7/2003
WO    WO-03064134 A1 *  8/2003  ......... B29C 45/1642
(Continued)

OTHER PUBLICATIONS

"Ogee." Merriam-Webster, Merriam-Webster, May 31, 2017, www.merriam-webster.com/dictionary/ogee. (Year: 2017).*
(Continued)

*Primary Examiner* — Nahida Sultana
*Assistant Examiner* — Margaret B Hayes

(57) ABSTRACT

A hot runner nozzle includes a nozzle body, an annular outlet channel in the nozzle body, a source channel upstream of the annular outlet channel in the nozzle body, and a flow transition channel in the nozzle body. The flow transition channel interconnects the source channel with a part-annular segment of the annular outlet channel. The flow transition channel widens in a downstream direction and has a non-uniform cross-sectional channel thickness in either or both of the longitudinal (downstream) and transverse directions. The geometry of the flow transition channel may promote at least one of a uniform velocity profile and a uniform (Continued)

temperature profile in a generated annular or part-annular melt flow.

18 Claims, 9 Drawing Sheets

(58) Field of Classification Search
USPC .......................................................... 425/130
See application file for complete search history.

(56) References Cited

U.S. PATENT DOCUMENTS

| | | | |
|---|---|---|---|
| 3,345,690 A | 10/1967 | Hagen | |
| 3,611,494 A | 10/1971 | Feuerherm | |
| 3,801,254 A | 4/1974 | Godtner | |
| 3,860,686 A | 1/1975 | Myers | |
| 4,010,903 A * | 3/1977 | Sakuri | B29C 45/2806 239/533.1 |
| 4,061,462 A * | 12/1977 | Giannarelli | B29C 48/86 425/464 |
| 4,279,851 A | 7/1981 | Lord et al. | |
| 4,422,838 A | 12/1983 | Iwawaki et al. | |
| 4,443,178 A * | 4/1984 | Fujita | B29C 45/231 264/328.12 |
| 4,917,593 A * | 4/1990 | Gellert | B29C 45/2806 264/328.15 |
| 5,028,227 A * | 7/1991 | Gellert | B29C 45/30 425/190 |
| 5,078,942 A | 1/1992 | Sullivan et al. | |
| 5,779,898 A * | 7/1998 | Schwanekamp | B29C 48/273 210/324 |
| 5,891,381 A | 4/1999 | Bemis et al. | |
| 6,159,000 A | 12/2000 | Puri et al. | |
| 6,245,278 B1 * | 6/2001 | Lausenhammer | B29C 45/27 264/328.1 |
| 6,478,564 B1 * | 11/2002 | Tieu | B29C 48/705 425/145 |
| 6,524,093 B2 | 2/2003 | Bouti | |
| 6,679,697 B2 * | 1/2004 | Bouti | B29C 45/2806 425/130 |
| 6,767,486 B2 * | 7/2004 | Doughty | B29C 45/27 264/328.8 |
| 6,945,767 B2 | 9/2005 | Guenther et al. | |
| 7,182,592 B2 * | 2/2007 | Perez | F23Q 2/164 431/153 |
| 7,306,446 B2 | 12/2007 | Sabin et al. | |
| 7,364,425 B2 * | 4/2008 | Fairy | B29C 45/278 425/564 |
| 8,545,212 B2 | 10/2013 | Belzile et al. | |
| 2001/0033044 A1 * | 10/2001 | Fikani | B29C 45/278 264/328.15 |
| 2002/0190413 A1 * | 12/2002 | Kazmer | B29C 45/2806 264/40.7 |
| 2003/0124216 A1 | 7/2003 | Guenther et al. | |
| 2003/0180412 A1 * | 9/2003 | Fong | B29C 45/278 425/568 |
| 2003/0211199 A1 * | 11/2003 | Eigler | B29C 45/278 425/571 |
| 2008/0093773 A1 * | 4/2008 | Schwarzkopf | B29C 45/2803 264/328.11 |
| 2009/0110765 A1 * | 4/2009 | Mohammed | B29C 45/30 425/191 |
| 2009/0206510 A1 * | 8/2009 | Rasmussen | B29C 48/305 264/177.16 |
| 2009/0255262 A1 * | 10/2009 | McMasters | F23R 3/28 60/742 |
| 2014/0183781 A1 * | 7/2014 | Poddar | B29C 48/325 264/209.8 |
| 2017/0008242 A1 * | 1/2017 | Legatt | B29C 48/08 |

FOREIGN PATENT DOCUMENTS

| | | | |
|---|---|---|---|
| WO | 2016131130 A1 | 8/2016 | |
| WO | WO-2016131130 A1 * | 8/2016 | ............. B29C 45/27 |

OTHER PUBLICATIONS

"Transverse." Merriam-Webster, Merriam-Webster, Mar. 19, 2016, www.merriam-webster.com/dictionary/transverse. (Year: 2016).*
PCT International Search Report, Pengfei Zhang, Feb. 8, 2018, 4 Pages.

* cited by examiner

CHANNEL GEOMETRY FOR PROMOTING AT LEAST ONE OF A UNIFORM VELOCITY PROFILE AND A UNIFORM TEMPERATURE PROFILE FOR AN ANNULAR OR PART-ANNULAR MELT FLOW

TECHNICAL FIELD

The present disclosure relates to apparatuses having channels for flowing melted molding material ("melt"), and more particularly to a channel geometry for promoting at least one of a uniform velocity profile and a uniform temperature profile for an annular or part-annular melt flow.

BACKGROUND

A molding apparatus may channel a flow of melted molding material, such as melted plastic or resin, through a distribution network, such as a hot runner, for dispensing into a mold through a nozzle. Dispensing of the melted molding material may occur during injection molding for example.

Melted molding material may be dispensed in an annular flow. For example, an annular flow may be dispensed or injected into a mold cavity during injection molding of an article having a generally tubular shape, such as a preform that is blow moldable to form a container.

A molding apparatus may generate an annular melt flow from a non-annular melt flow using what is colloquially referred to as a "coat hanger" channel geometry. In such a channel geometry, melted molding material may flow from a single inlet or source into a pair of collector channels. The two collector channels may have the shape of two curved, minor-image tusks extending from the single common inlet and meeting at their distal ends. The tusk-shaped channels may thus define clockwise and counter-clockwise flows that meet at a termination point on an opposite side of the resulting annulus from the inlet. An annular overflow passage may allow melt to propagate downwardly past the collector channel termination point. The overflow passage may take the form of a constant width split at a downstream-most edge of the collector channels, through which molding material may pass to form an annular flow.

The above-described collector channel geometry may yield a non-uniform velocity profile in which a velocity of the annular flow portion that is closest to the inlet may be higher than a velocity of the remainder of the annular flow. As well, the temperature of the melt at the inlet side may be higher than elsewhere in the resultant annular flow. This may result in anomalies in molded articles, such as witness lines in areas where injected barrier molding material was hotter than in adjacent mold areas.

SUMMARY

According to one aspect of the present disclosure, there is provided a hot runner nozzle comprising: a nozzle body; an annular outlet channel in the nozzle body; a source channel upstream of the annular outlet channel in the nozzle body; and a flow transition channel in the nozzle body interconnecting the source channel with a part-annular segment of the annular outlet channel, the flow transition channel widening in a downstream direction and having a non-uniform cross-sectional channel thickness.

In some embodiments, the non-uniform cross-sectional channel thickness comprises a non-uniform longitudinal cross-sectional channel thickness. The channel thickness may progressively decrease in the downstream direction, from an input thickness to an output thickness.

In some embodiments, the non-uniform cross-sectional channel thickness comprises a non-uniform transverse cross-sectional channel thickness. The channel thickness may progressively increase, in a transverse direction, from a central thickness to a peripheral thickness.

In some embodiments, the non-uniform transverse cross-sectional channel thickness is in a downstream section of the flow transition channel at or near an outlet of the flow transition channel.

The non-uniform transverse cross-sectional thickness may be at least partly defined by an area of reduced channel thickness that is transversely aligned with the source channel.

In some embodiments, the area of reduced channel thickness has length, in the downstream direction, of about one-third of a length of the flow transition channel in the downstream direction.

In some embodiments, the area of reduced channel thickness is transversely centered within the flow transition channel. In others, the area of reduced channel thickness is transversely off-center within the flow transition channel.

In some embodiments, a thickness of the flow transition channel, in the area of reduced channel thickness, is uniform over a central widthwise extent of the channel.

The area of reduced channel thickness may be at least partly defined by an obstructing feature within the flow transition channel for obstructing a flow of melted molding material through the flow transition channel. The obstructing feature may widen in the downstream direction or may be substantially triangular.

In some embodiments, the flow transition channel is defined by a pair of opposing narrow side walls having respective ogee shapes.

The flow transition channel may be a first flow transition channel of a plurality of like flow transition channels in the nozzle body, the plurality of flow transition channels being arranged in a ring for collectively defining an annular melt flow for supplying the annular outlet channel.

In some embodiments, the annular melt flow is an intermediate annular melt flow and the nozzle body comprises:
an inner channel structure configured to define an inner flow;
an outer channel structure configured to define an outer annular flow about the inner flow; and
an intermediate channel structure configured to define the intermediate annular flow between the inner flow and outer annular flow.

In some embodiments, the hot runner nozzle comprises a housing, an insert that fits over the housing, and a tip that fits over the insert, the housing defines the inner channel structure and cooperates with the insert to collectively define the intermediate channel structure, and the insert cooperates with the tip to collectively define the outer channel structure.

Other features will become apparent from the drawings in conjunction with the following description.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE
NON-LIMITING EMBODIMENT(S)

In this document, the term "semi-annular" should be understood to mean "shaped like a segment of an annulus" rather than necessarily meaning "shaped like half of an annulus." The term "part-annular" should be understood to have the same meaning. In this document, the term "exemplary" should be understood to mean "an example of" and not necessarily to mean that the example is preferable or optimal in some way. Terms such as "top," "bottom," and "height" may be used to describe some embodiments in this description but should not be understood to necessarily connote an orientation of the embodiments during use.

Figure 1:
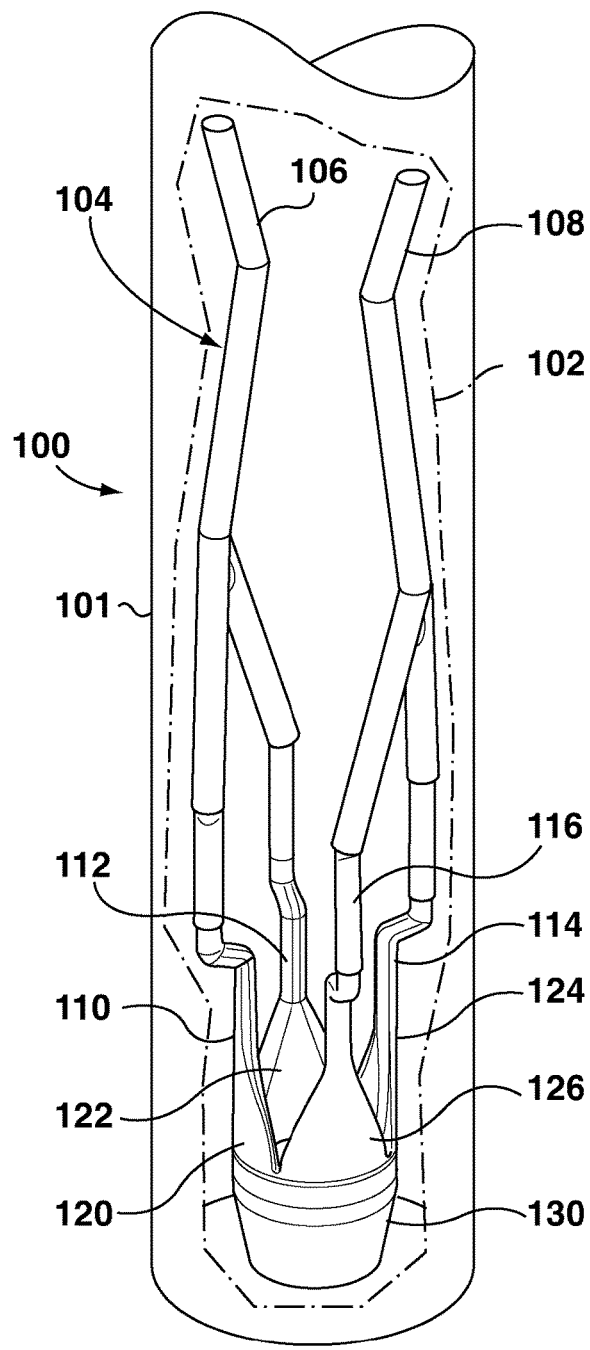
FIG. 1 is a top perspective view of an apparatus for flowing melted molding material.
Figure 2:
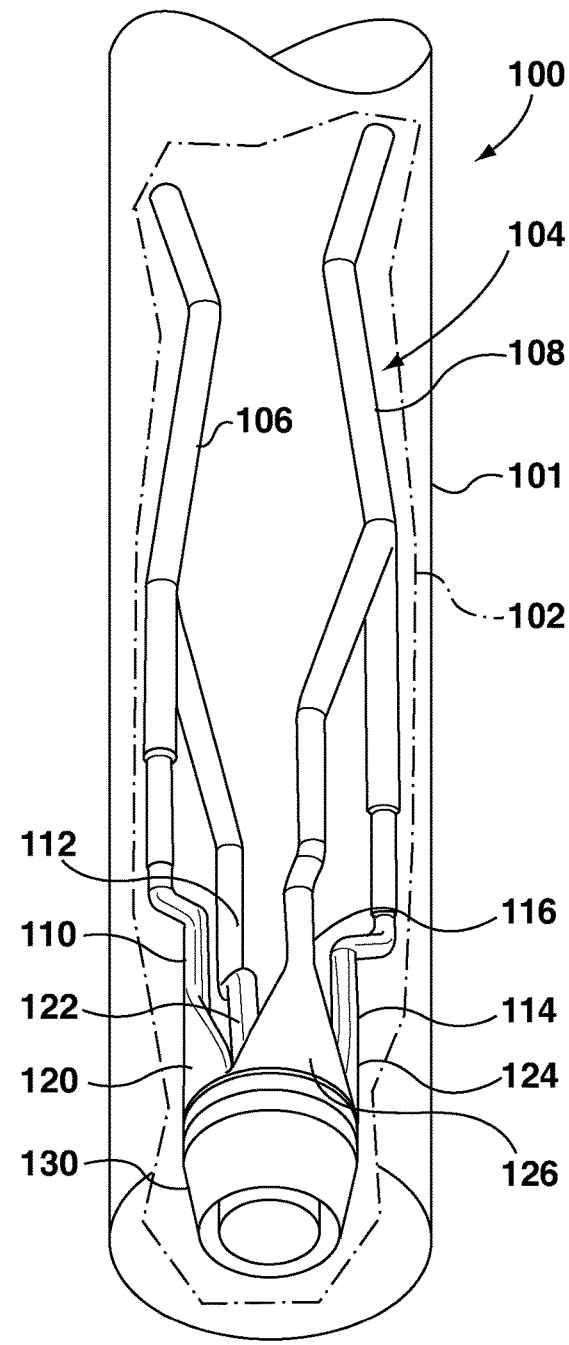
FIG. 2 is a bottom perspective view of the apparatus of FIG. 1.

Referring to FIGS. 1 and 2, an exemplary apparatus 100 for flowing melted molding material is illustrated in top and bottom perspective cutaway views, respectively. The exemplary apparatus 100 is designed to produce an annular flow of melted molding material from multiple input flows, which may have a common source. The apparatus 100 may for example form part of an injection molding machine (not illustrated). In some embodiments, the apparatus 100 may be a hot runner nozzle. In other embodiments, the apparatus could be a manifold bushing that feeds a hot runner nozzle.

Figure 14:
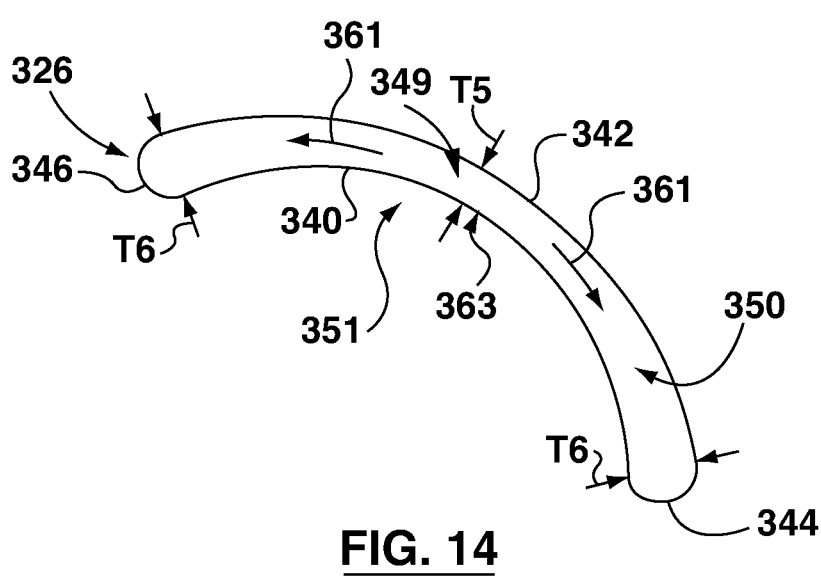
FIG. 14 is a bottom view of the flow transition channel of FIG. 13.

A cutaway section 102, depicted in dashed lines in FIGS. 1 and 2, reveals a network of channels 104 within a body of the apparatus 100 (i.e. within the apparatus body, which may be a nozzle body or a bushing body for example) through which the melted molding material flows. The network of channels 104 is depicted in FIGS. 1 and 2 as though the channels were formed from thin-walled tubes whose external shapes reflect the shapes of the negative or hollow spaces defined therewithin. This is merely to illustrate the shape of the channels and should not be understood to mean that any such thin-walled tubes actually necessarily exist. The channels may actually be defined by one or more component parts and/or as spaces between adjacent parts. An example embodiment revealing one possible structure of the apparatus is shown in FIG. 14, which is described below. It will be understood that different embodiments may adopt different structures.

The apparatus 100 could be made from any suitable material, using any of a number of manufacturing techniques, including but not limited to additive manufacturing techniques (e.g. direct metal laser sintering, which may be considered analogous to 3D printing).

The intended direction of flow of melted molding material through apparatus 100 of FIGS. 1 and 2 is top to bottom. When melted molding material fills the network of channels 104, the melt volume may have a similar shape to that of the network of channels 104 depicted in FIGS. 1 and 2.

The network of channels 104 includes pair of tubular primary channels 106, 108. Each primary channel 106 and 108 splits into a respective pair of tubular secondary channels 110, 112 and 114, 116. In the illustrated embodiment, the secondary channels 110, 112 and 114, 116 are substantially semi-cylindrical at their downstream-most ends, with the flat side of the semi-cylinder facing outwardly. This is in view of the nested nature of the three components forming the assembly, i.e. the housing 402, insert 404 and tip 406, described below. In particular, the outside of channels 110, 112, 114 and 116 is defined by the inner diameter of the insert 404. This shape may be considered a compromise and not necessarily ideal for uniform flow. The precise shape and arrangement of primary and/or secondary channels may vary between embodiments. For example, the secondary channels in some embodiments, such as those made using additive manufacturing, could have a shape different from semi-circular (e.g. cylindrical). The secondary channels may be referred to as source channels because they act as sources of melted molding material for downstream flow transition channels, described below.

Each secondary channel 110, 112, 114 and 116 is in fluid communication with, or interconnects with, a respective flow transition channel 120, 122, 124 and 126. The purpose of a flow transition channel is to change the shape of the flow from non-annular (semi-cylindrical in the present embodiment) to part-annular (quarter-annular in the present embodiment). As will be described, the geometry of each flow transition channel 120, 122, 124 and 126 may be configured in various ways to promote at least one of a uniform velocity profile and a uniform temperature profile across the resultant part-annular flow of melted molding material that is output by the channel. This is done so that, when the flow transition channels 120, 122, 124 and 126 are arranged in a ring, part-annular flows will collectively form an annular flow whose flow velocity and/or temperature are uniform, or substantially uniform, about the circumference of the annular flow.

In some embodiments, the flows feeding the flow transition channels 120, 122, 124 and 126 may have a common source, i.e. may be fluidly connected, upstream of the flow transition channels 120, 122, 124 and 126 to further promote or enhance this uniformity or substantial uniformity. Moreover, some embodiments may employ an upstream melt-splitting device designed to promote thermal symmetry in the split flows feeding channels 120, 122, 124 and 126, as described in U.S. Pat. No. 8,545,212 for example, which is hereby incorporated by reference hereinto. Such melt-splitting devices may split a single flow into substantially equal "wedges" such that each flow comprises a substantially equal portion of a hotter outside flow and a substantially equal portion of a cooler inside flow.

The network of channels 104 further comprises an annular outlet channel 130 for channeling the annular flow that is formed from the multiple semi-annular flows. In particular, each flow transition channel has a semi-annular outlet that fluidly communicates or interconnects with a corresponding semi-annular segment of the annular outlet channel 130. In other words, each flow transition channel 120, 122, 124 and 126 interconnects a respective source channel 110, 112, 114 and 116 with a respective segment (here, a quarter-annular segment) of the annular outlet channel 130. In some embodiments, the annular outlet channel 130 may be a nozzle outlet for example.

The annular outlet channel 130 may have a downstream taper which may give the channel 130 a frusto-conical shape. The taper of the channel 130 may reduce a cross-sectional thickness (e.g. a difference between the outer diameter and inner diameter of the annular channel) or cross-sectional area of the annular outlet channel 130 in the downstream direction. This feature, which is not necessarily present in all embodiments, may cause the pressure of the melt within the channel 130 to increase in the downstream direction. The increase in pressure may in turn promote a more even distribution of melt circumferentially about the annular outlet channel 130, i.e. may help to promote a uniform velocity profile of the annular melt flow output by the annular outlet channel 130. The taper may also act to reduce the temperature gradient of the melt stream. In particular, a reduced cross-section may add heat, from shear, to the melt stream, with cooler (more viscous) material shear-heating more than the warmer (less viscous) melt. In the result, the melt stream downstream of the taper may have a more homogenous temperature profile than without the taper. The profile of the melt temperature before and after the cross-section reduction may remain generally the same, but the difference in temperature between the hottest and coolest areas may be reduced. The taper may also correspond to a tapered shape of the apparatus 100. For example, if the apparatus 100 is a nozzle, the taper may correspond to the tapered shape of a tip section of the nozzle. For clarity, the downstream taper should not be understood as necessarily being present in all embodiments.

Figure 3:
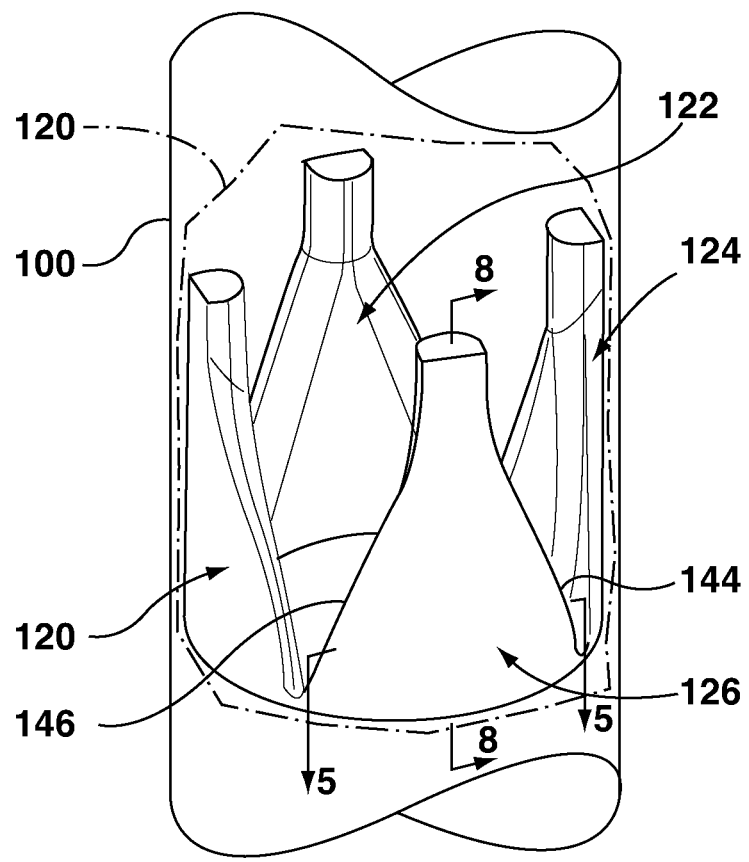
FIG. 3 is a top perspective view of a portion of the apparatus of FIG. 1 illustrating a plurality of flow transition channels defined within the apparatus.

FIG. 3 illustrates, in top perspective view, a portion of apparatus 100 showing the flow transition channels 120, 122, 124 and 126 of FIGS. 1 and 2 in isolation from the remainder of the network of channels 104. As can be seen, each flow transition channel 120, 122, 124 and 126 has a tubular inlet (here, semi-cylindrical) and widens in the downstream direction. The shape of each flow transition channel may be compared to that of an inverted funnel whose larger opening has been flattened and bent to form part of an annulus. As such, the flow transition channel has a curved transverse cross section, where "transverse" is with respect to the longitudinal direction of melt flow. When viewed broadside, each flow transition channel may be considered to have a "tulip" (or, more precisely, inverted tulip) shape.

An example flow transition channel 126 is illustrated in greater detail in FIGS. 4-8. The other flow transition channels 120, 122 and 124 may have a similar appearance.

As illustrated, channel 126 has a curved inner wall 140, a curved outer wall 142, and a pair of narrow opposing side walls 144 and 146. In the illustrated embodiment, the opposing side walls 144 and 146 flare away from one another in the downstream direction or, more generally, the pair of side walls 144 and 146 diverges in the downstream direction. The side walls 144, 146 have respective ogee shapes which are perhaps best seen in FIG. 3. In the present embodiment, the ogee shaped walls 144, 146 are mirror images of one another, with each wall having an upstream convex ogee portion and a downstream concave ogee portion. Ogee-shaped side walls may facilitate manufacture of the apparatus 100 in some embodiments. In particular, the ogee shape may be a function of how flow transition channels are machined in a cylindrical face, e.g. by milling downwards as the component is selectively rotated about its center axis. Such ogee-shaped side walls are not necessarily present in all embodiments.

Figure 6:
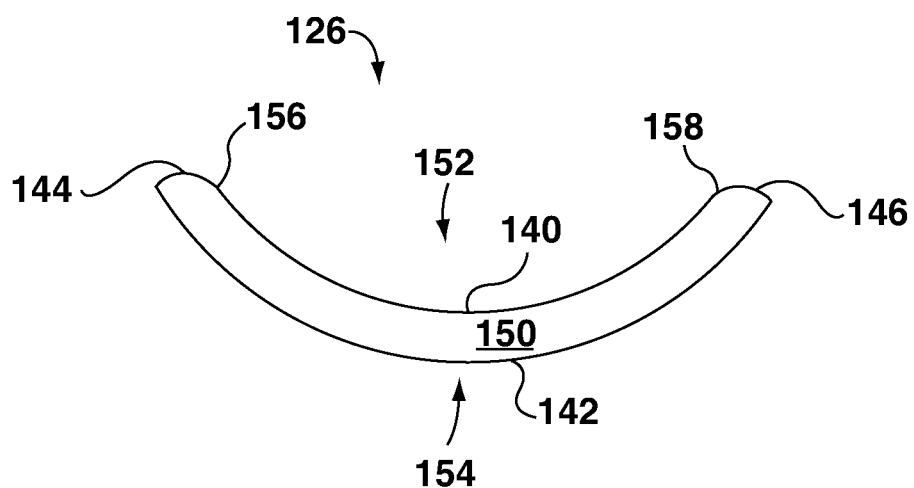
FIG. 6 is a bottom view of the flow transition channel of FIG. 4.
Figure 4:
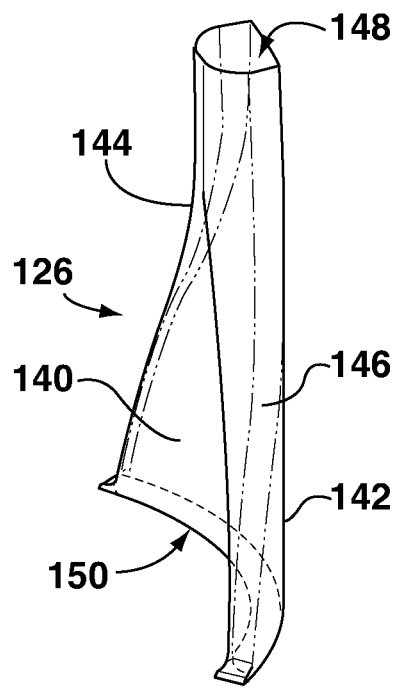
FIG. 4 is a perspective view of one of the flow transition channels of FIG. 3.

The channel 126 has an inlet 148 (see FIGS. 4 and 7) and an outlet 150 (see FIG. 6). The inlet is tubular and, in the present embodiment, semi-cylindrical. The outlet 150 is part-annulus shaped, i.e. shaped like a segment of an annulus (quarter-annular in this embodiment). As such, the outlet 150 has a convex side 152 (defined by a convex wall 140) and a concave side 154 (defined by concave wall 142). The convex wall has rounded edges 156 and 158, which may be a result of manufacturing techniques used to mill the channel 126 in some embodiments of the apparatus 100.

Figure 5:
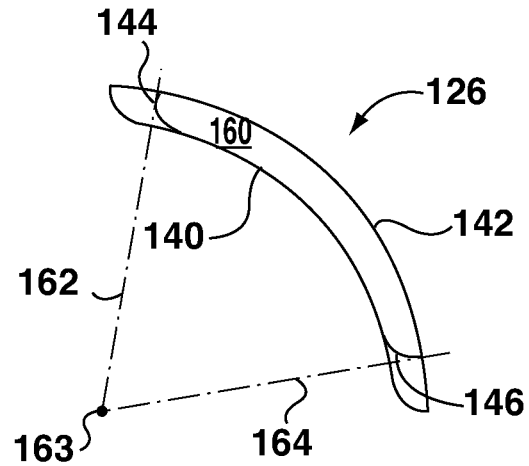
FIG. 5 is a transverse cross section of the flow transition channel of FIG. 4.

A transverse cross section 160 taken along line 5-5 of the flow transition channel 126 (see FIG. 3) is depicted in FIG. 5. The transverse cross section 160 is curved in a similar manner as the outlet 150, and in particular is shaped like part of an annulus. It will be appreciated that the transverse cross-section may not be part-annular in all areas of the flow transition channel 126 or in all embodiments. For example, if the flow transition channel 126 transitions from circular (or near-circular) at its upstream inlet end to part-annular at its downstream end, there may be portions of the channel along which a transverse cross-section is not part-annular. In this example, the part-annular cross-section 160 spans a lesser annular portion than the outlet 150 in view of the progressive widening of the flow transition channel in the downstream direction (e.g. the cross-section 160 is not fully quarter annular like the downstream outlet 150 of the present embodiment).

As indicated by the dashed lines 162 and 164 of FIG. 5, the side walls 144 and 146 of the flow transition channel 126 may be normal to a notional annulus occupied by the transverse cross section 160 having a notional center 163. In other words, each of the side walls 144, 146 may be substantially perpendicular to the cylindrical inner or outer boundaries of the notional annulus. In some embodiments, this will be true regardless of where the transverse cross section 160 is taken along the longitudinal extent of the flow transition channel 126. That is, the side walls 144 and 146 may be perpendicular to an inner or outer boundary of a notional annulus over the entire length of the side walls, or at least over a downstream-most portion of their length. This may promote smooth merging of the resulting semi-annular melt flow with each adjacent semi-annular melt flow, i.e. adjacent semi-annular flows are smooth and steady at a junction therebetween.

Figure 7:
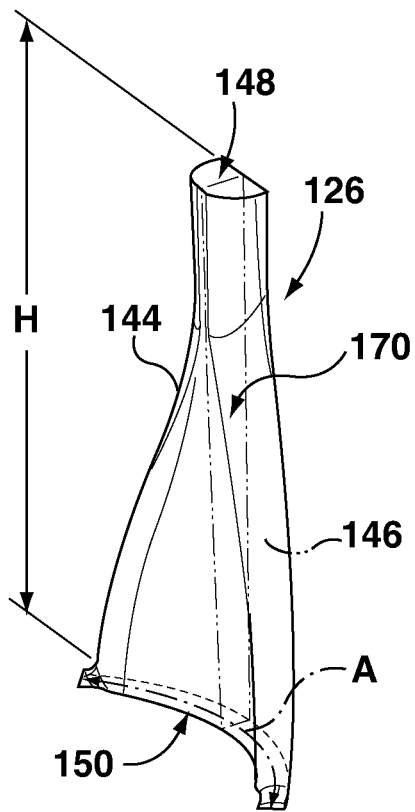
FIG. 7 is another perspective view of the flow transition channel of FIG. 4.

Referring to FIG. 7, it can be seen that the flow transition channel 126 has a height H and an arc length of A. The arc length A may be measured along an arc that is between (e.g. at a midpoint between) the concave side of the channel outlet 150 and the convex side of the channel outlet 150. The arc length can be approximated as a function of the number of flow transition channels used to form the annular flow and the radius of an inlet of the annular outlet channel 130. For example, if there are four flow transition channels and the annular outlet channel has a radius of 10 mm (e.g. halfway between the inner and outer diameters of the outlet channel), then the arc length A may be determined as (2*π/4 flow transition channels)*10 mm radius.

The ratio of H to A is an aspect of the geometry of a flow transition channel that may be used, in some embodiments, to promote a uniform flow velocity across the resulting semi-annular flow of melted molding material. In particular, an H:A ratio of about 1.5 may promote a uniform flow velocity across the semi-annular melt flow. Thus, a longitudinal extent of the flow transition channel may be about 1.5 times the extent of an arc spanned by the outlet of the channel. The arc may be a notional arc that is halfway between a convex side and a concave side of the outlet of the flow transition channel. A lower ratio may yield a less desirable flow pattern, e.g. because there may be insufficient space for a non-annular longitudinal inbound flow to be sufficiently spread out to form a part-annular flow of substantially uniform velocity. A higher ratio can also result in a less desirable flow pattern due to excessive shear heating at the narrow side walls, which may result in higher temperatures, and thus higher flow velocities, at the side walls in comparison to other areas of the channel.

Figure 8:
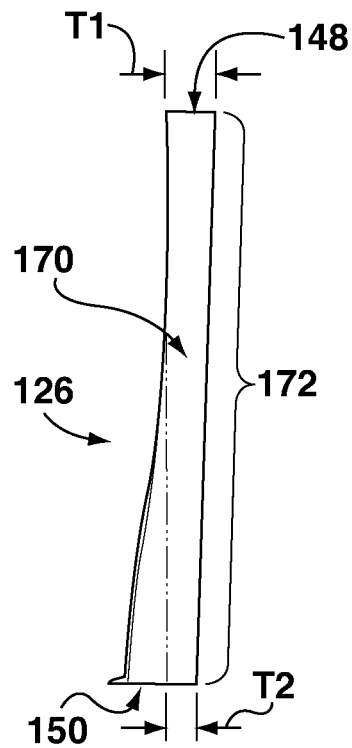
FIG. 8 is longitudinal cross section of the flow transition channel of FIG. 4.

A longitudinal cross section 170 of flow transition channel 126, which is taken along center line 8-8 of FIG. 3, is illustrated in FIGS. 7 and 8. The longitudinal cross section 170 reveals a progressive decrease in the thickness of the flow transition channel 126 in the downstream direction, from an input thickness T1 to an output thickness T2 (see FIG. 8), in the embodiment illustrated in those figures. Put another way, the flow transition channel 126 may be considered to have a non-uniform cross-sectional channel thickness over its length. The decreasing channel thickness is one aspect of the geometry of a flow transition channel that may be used, in some embodiments, to promote a uniform flow velocity across the resulting semi-annular flow of melted molding material. In particular, the progressive decrease in thickness may encourage a longitudinal stream of molding material of higher velocity to spread out widthwise (i.e. laterally or transversely) between the walls 144, 146.

A decreasing downstream thickness, e.g. as shown in FIG. 8, may also affect the temperature profile of the melt across the part-annular outlet 150. In particular, the temperature of the melt flowing along side walls 144, 146 may generally be higher than that of melt in the center of the channel 126 due to shear heating effects. Reducing the thickness of the channel, e.g. progressively along its length or immediately upstream of outlet 150, will increase shear heating of the melt in the thinned channel areas. The shear heating effects may particularly affect more viscous (cooler) areas of melt. As a result, the difference in temperature between the hottest and coolest portions of the resulting melt stream at outlet 150 may be reduced in comparison to an embodiment lacking an area of reduced channel thickness. Thus, the reduced channel thickness may increase the homogeneity of the temperature profile of the outflowing melt.

When the thickness of the flow transition channel 126 decreases in the downstream direction, the flow transition channel 126 may nevertheless be shaped so that the transverse cross-sectional area remains the same (or substantially the same) along the length of the flow transition channel 126. This may be done by correspondingly widening the channel as its thickness decreases. A possible reason for such shaping may be to help maintain a consistent shear rate of the melt flow throughout the flow transition channel 126. Reducing the cross sectional thickness as the side walls diverge may also reduce the residence time of the melt within the thinner portion of the channel. The melt velocity may be high, and the higher shear rate may remove the melt closest to the channel wall more quickly.

Figure 9:
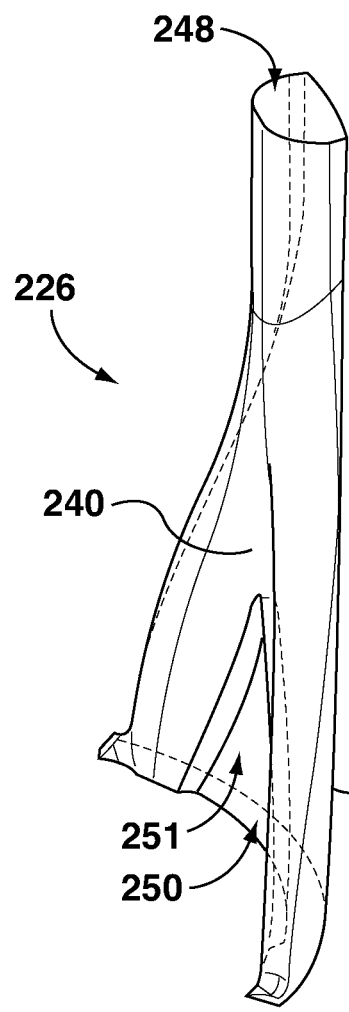
FIG. 9 is a side perspective view of an alternative flow transition channel from an alternative embodiment of an apparatus for flowing melted molding material.
Figure 10:
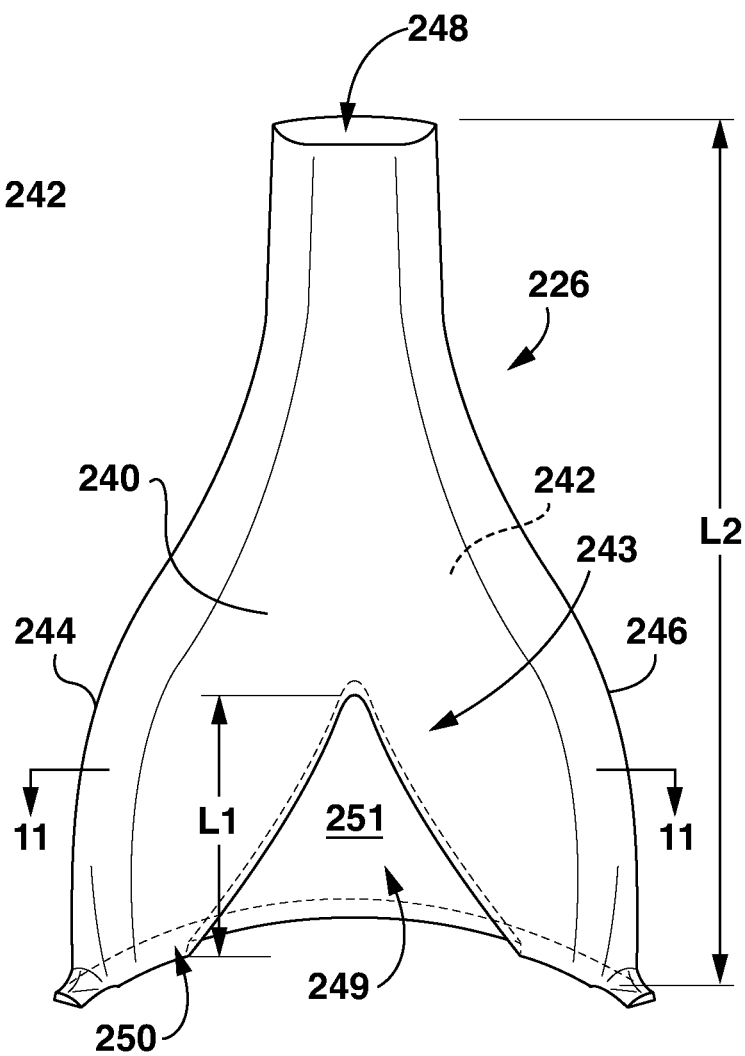
FIG. 10 is a rear perspective view of the flow transition channel of FIG. 9.

In some embodiments, the above-described approach of maintaining a consistent cross sectional area along the downstream length of the channel can be combined with the approach of introducing a constriction or obstructing feature in the channel, for promoting uniform melt temperature and velocity profile across the entire part-annular outlet (e.g. as shown in FIGS. 9 and 10, described below).

In some embodiments, the outlet area may even be larger than the inlet area, e.g. if avoidance of pressure drop is of paramount concern.

Figure 11:
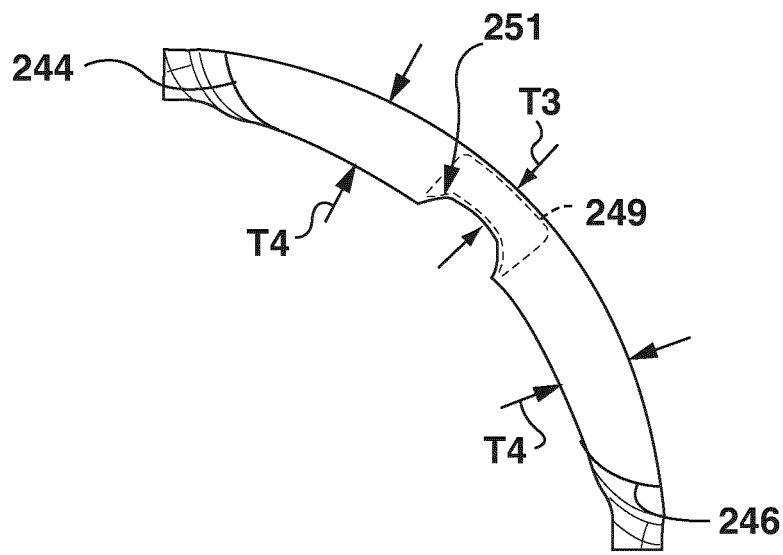
FIG. 11 is a transverse cross-section of the flow transition channel of FIGS. 9 and 10.
Figure 12:
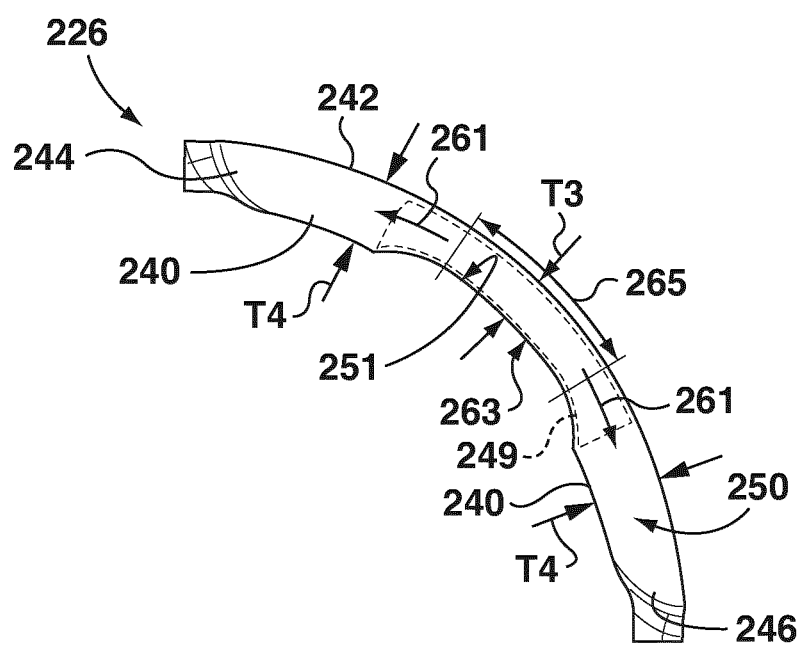
FIG. 12 is a bottom view of the flow transition channel of FIGS. 9, 10 and 11.

Referring to FIGS. 9-12, an alternative flow transition channel 226, which may be used in an alternative embodiment apparatus for flowing melted molding material such as a nozzle or a manifold bushing for example, is illustrated. FIGS. 9 and 10 illustrate the flow transition channel 226 in side perspective view and rear perspective view, respectively; FIG. 11 illustrates a transverse cross-section of the flow transition channel 226 taken along line 11 of FIG. 10; and FIG. 12 illustrates the flow transition channel 226 in bottom view.

The flow transition channel 226 of FIGS. 9-12 differs from the flow transition channel 126 of FIGS. 4-8 primarily in the fact that the former has a non-uniform transverse cross-sectional channel thickness. In the present embodiment, the non-uniform transverse cross-sectional channel thickness results from an obstructing feature 251 within the channel 226 that reduces the channel thickness relative to that of the immediately adjacent regions of the channel, as will be described.

More generally, channel 226 has a curved inner wall 240 and a curved outer wall 242 similar to walls 140 and 142 respectively, described above. A pair of narrow opposing side walls 244 and 246 diverges in the downstream direction, with side walls 244 and 246 having respective ogee shapes similar to side walls 144 and 146 respectively, described above (the ogee shapes being optional). The channel 226 further has an inlet 248 (see FIGS. 9 and 10) and an outlet 250 (see FIGS. 9, 10 and 12). In the present embodiment, the inlet is tubular and, more specifically, semi-cylindrical. The inlet 248 is transversely centered with respect to the channel 226. The outlet 250 is substantially part-annulus shaped (quarter-annular in this embodiment).

As noted above, the flow transition channel 226 also has an area of reduced channel thickness 249, in a downstream section 243 of the channel (see e.g. FIGS. 9 and 10). In the present embodiment, the area of reduced channel thickness 249 is formed by an obstructing feature 251 that protrudes from inner wall 240 into the channel 226.

In the present embodiment, the obstructing feature 251, and thus the area of reduced channel thickness 249, is centered between the opposing side walls 244 and 246. This is perhaps best seen in FIGS. 10 and 12. The area of reduced channel thickness 249 is accordingly transversely aligned with the inlet 248.

The obstructing feature 251 of the present embodiment has a generally triangular shape, with the narrowest portion of the triangle being upstream-most (see e.g. FIG. 10). As such, the example obstructing feature 251 widens in the downstream direction. This is not necessarily true for all embodiments, which may incorporate obstructing features of different shapes.

As shown in FIGS. 11 and 12, the channel thickness T3 in the majority of the area of reduced channel thickness 249 is smaller than the channel thickness T4 in immediately adjacent areas of the channel 226. In some embodiments, T3 may represent a predetermined minimum thickness of a channel for limiting clogging problems. A melt flow entering channel 226 may contain suspended solid particles therein which may have resulted from upstream thermal effects, such as carbonization of resin when maintained at elevated temperatures for an excessive period of time. Carbonization may result in chunks of solid carbonized plastic in a melt flow. By adopting a channel thickness that is no less than T3 even in the area of reduced channel thickness 249, the risk of clogging of the area 249 by such particles may by reduced or eliminated.

In the present embodiment, the thickness T3 of the channel 226 is uniform over a central widthwise extent 265 of the flow transition channel 226 at the outlet 250 of the channel (see FIG. 12). This is not necessarily true for all embodiments. In the illustrated example, the widthwise extent 265 is approximately one-quarter of that of the widthwise extent of outlet 250 but this may vary between embodiments.

Referring to FIG. 10, it can be seen that the length L1 of the area of reduced channel thickness 249, i.e. its longitudinal or downstream extent, is approximately one-third of the overall length L2 of the flow transition channel 226. This may vary between embodiments.

It will be appreciated that the area of reduced channel thickness 249 may serve at least one of two purposes.

A first purpose served by the area of reduced channel thickness 249 may be to promote a uniformity of melt flow velocity across the part-annular outlet 250. The area of reduced channel thickness 249 may achieve this result by creating a transverse pressure gradient within the channel 226. In particular, the pressure of the melt within a transverse cross-section of the channel 226 may be highest in area of reduced channel thickness 249, which is centrally disposed in the present embodiment. This may encourage the melt to flow laterally or transversely away from the center of the channel 226 towards areas of lower pressure within the flow transition channel 226, as depicted in FIG. 12 by opposing arrows 261. The area of reduced channel thickness 249 may thus counteract the tendency of the inbound melt, flowing from tubular inlet 248 towards outlet 250, to continue along the same trajectory (here, a central longitudinal trajectory) despite the widening of the channel 226 in the downstream direction. This is due to the placement of the area of reduced channel thickness 249 in the path of the inbound melt flow, i.e. by virtue of the transverse alignment of the area of reduced channel thickness 249 with the inlet 248.

A second purpose served by the area of reduced channel thickness 249 may be to promote a uniform temperature profile across the part-annular flow of melted molding material at outlet 250. In particular, the shear forces from the area of reduced channel thickness 249 may increase the temperature of the melt passing through that area. Melt flowing through the area of reduced channel thickness 249 may increase in temperature by a similar degree to that by which the melt flowing adjacent to either of the narrow side walls 244, 246 of the flow transition channel 226 increases due to shear forces. As a result, the area of reduced channel thickness 249 may promote uniformity of temperature across the part-annular outlet 250 of the channel 226. Thus, by incorporating an area of reduced channel thickness 249 that is situated away from each of the narrow side walls 244, 246, the temperature of the melt may be substantially equalized across the width of the part-annular outlet 250, or will create a more uniform temperature profile across the outlet 250.

It will be appreciated that, in a hypothetical alternative embodiment of channel 226 that lacks an area of reduced channel thickness 249 but is otherwise identical to what is depicted in FIGS. 9-12, the melt in the central portion of the flow at outlet 250 could be cooler than the melt at the narrow side walls 244, 246, for at least some types of flowable melted materials in view of a difference in shear forces between those areas. This may have various types of detrimental effects. In one example, if the flow transition channel 226 is one of a plurality of flow transition channels arranged in a ring, the resultant annular melt stream may undesirably include longitudinal "stripes" or areas of higher temperature and lower viscosity, which may be referred to as "witness lines." In cases where the annular melt stream represents a barrier material that is to be sandwiched between inner and outer skin layers of melt in a co-injection context, the lower viscosity melt at the witness lines may be more susceptible to deformation by inner or outer skin layers, which may displace the barrier material to a greater degree in those areas than in areas of lower temperature barrier material. The resultant longitudinal "witness lines" in the barrier layer may be disadvantageous for a variety of reasons.

For example, if the barrier material is pigmented, the color of the pigment may appear lighter at the witness lines, which may be aesthetically displeasing or may detrimentally diminish light-blocking effects. Alternatively, if the barrier material is intended to reduce permeability to oxygen, the witness lines may undesirably introduces areas of locally increased oxygen permeability in any resultant blow-molded container, which may in turn increase a susceptibility of foods or beverages stored in such containers to spoilage.

Figure 13:
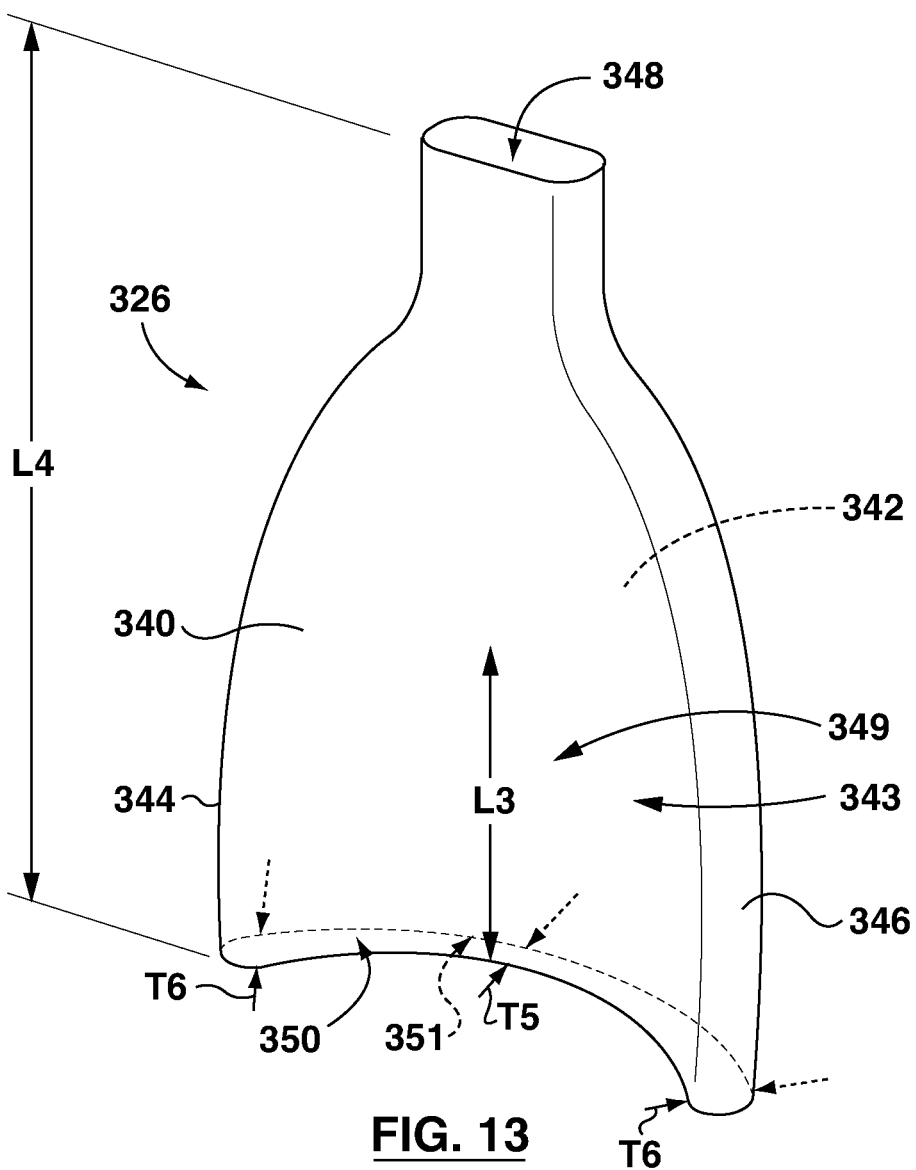
FIG. 13 is a perspective view of an alternative flow transition channel from a further alternative embodiment of apparatus for flowing melted molding material.

Referring to FIGS. 13 and 14, another alternative flow transition channel 326 is illustrated in perspective and bottom view, respectively. The flow transition channel 326 may be used in an alternative embodiment apparatus for flowing melted molding material, such as an alternative nozzle or manifold bushing for example.

In many respects, the flow transition channel 326 is similar to the flow transition channel 226 of FIGS. 9-12. The flow transition channel 326 has a generally curved inner wall 340 and a general curved outer wall 342, which are similar to walls 240 and 242 respectively (described above). A pair of narrow opposing side walls 344 and 346 diverges in the downstream direction. The example walls have respective ogee shapes, similar to side walls 244 and 246 respectively. The ogee shapes are optional. The channel 326 further has an inlet 348 (see FIG. 13) and an outlet 350 (see FIGS. 13 and 14). The inlet 348 is transversely centered with respect to the channel 326. The outlet 350 is substantially part-annulus shaped.

Like channel 226, the flow transition channel 326 of FIGS. 13 and 14 has an area of reduced channel thickness 349 in a downstream section 343 of the channel 326, which is aligned with the channel inlet 348 and is centered between opposing side walls 344, 346. The length L3 of the area of reduced channel thickness 349, i.e. its longitudinal or downstream extent, is also about one-third of the length L4 of the flow transition channel 326 in the illustrated embodiment. The thickness of channel 326 is smallest (T5) at a midpoint between side walls 344, 346, at or near outlet 350.

However, the design of the area of reduced channel thickness 349 of FIGS. 13 and 14 differs from that of the area 249 of FIGS. 9-12 in that the former does not result from the presence of a discrete obstructing feature like feature 251. Rather, the area of reduced channel thickness 349 is formed by a continuous, gradual thinning or tapering of the channel 326 in both the longitudinal and transverse directions. Longitudinally, the tapering is from top to bottom in FIG. 13. Transversely, the tapering is from each of sidewalls 344, 346 inwardly towards a central point of the channel, in a downstream section 343 of the channel. Thus, at the outlet 350, the channel thickness progressively increases, in a transverse direction, from a central thickness T5 to a peripheral thickness T6.

The area of reduced channel thickness 349 may serve either one or both of the same two purposes as may be served by the area of reduced channel thickness 249, described above, i.e. promoting a uniform melt velocity profile and/or uniform melt temperature profile across the part-annular channel outlet.

As will be appreciated from the foregoing, the presence of an area of reduced channel thickness 249 or 349 within the flow transition channel is an aspect of the geometry of a flow transition channel that may be used to promote at least one of a uniform velocity profile and a uniform temperature profile across a part-annular flow of melted molding material.

Figure 15:
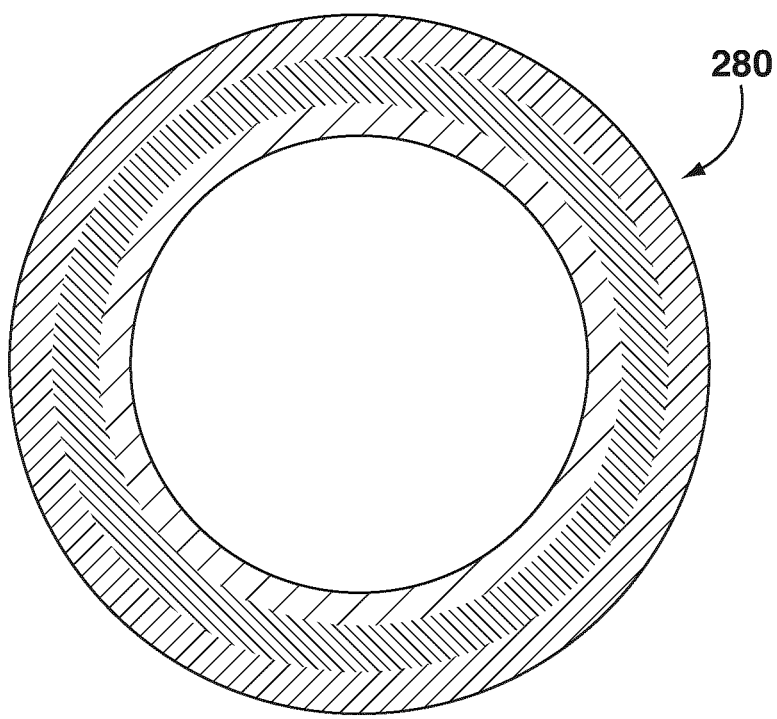
FIG. 15 illustrates a flow velocity profile of an annular flow produced by an apparatus using any of the above-referenced flow transition channels.

Regardless of which of the above-described aspects of channel geometry may be employed in a particular embodiment for promoting a uniform velocity over a part-annular flow, when multiple flow transition channels employing such geometries are arranged in a ring, the result may be an annular flow whose velocity is substantially or wholly uniform over its circumference, as illustrated in the velocity profile 280 of FIG. 15 for example. In FIG. 15, regions that are identically shaded represent regions where the melt flow velocity is the same. In FIG. 15, it can be seen that the melt flow velocity varies with distance away from the inner and outer cylindrical channel walls, with melt flow generally being slower proximate to the walls due to friction. However, it can be seen that the melt flow velocity in FIG. 15 is substantially uniform circumferentially.

Producing an annular flow with a uniform flow velocity about its circumference, as shown in FIG. 15 for example, may be desirable for various reasons and in various applications. One such application may be co-injection. Co-injection may refer to the simultaneous dispensing of two different molding materials into a mold cavity during the same injection molding cycle. Co-injection may for example be performed when it is desired for a molded article to have an inner and/or outer skin made from one molding material (e.g. polyethylene terephthalate or "PET") and a core made from another molding material (e.g. a barrier material or doped PET). When such co-injection is performed, each of the different materials may be dispensed as an annular flow, with the two flows being combined during injection.

During co-injection, an annular flow of core material may be dispensed only selectively during the dispensing of an annular flow of skin material. The flow may be terminated to prevent core material from being exposed on outer surfaces of the molded article, as the core material may not be approved for contact with a consumable food or beverage product that may occupy a container blow-molded from the molded article.

In another example, in cases where the molded article is a preform shaped generally like a test tube having threaded neck region and a hemispherical base, it may be desired for the core material to appear only within the walls of the preform and not within the neck region or the base. This may be desired to reduce manufacturing costs, e.g. because the core material may be more expensive than the skin material and because the core material is unnecessary in the neck region or base. When dispensing of one of the annular melt flows, such as the core melt flow, is ceased, it may be desired for the cessation to be substantially immediate and uniform across the circumference of the stream. This may promote quality in the molded articles, e.g. by discouraging the formation of so-called "dips" or "fingers" of core material within areas of the article that are intended to be free of the core material. Promoting a uniform flow velocity throughout the annular flow of core material, and/or throughout the annular flow of skin material, may limit or avoid such undesirable formations.

Figure 16:
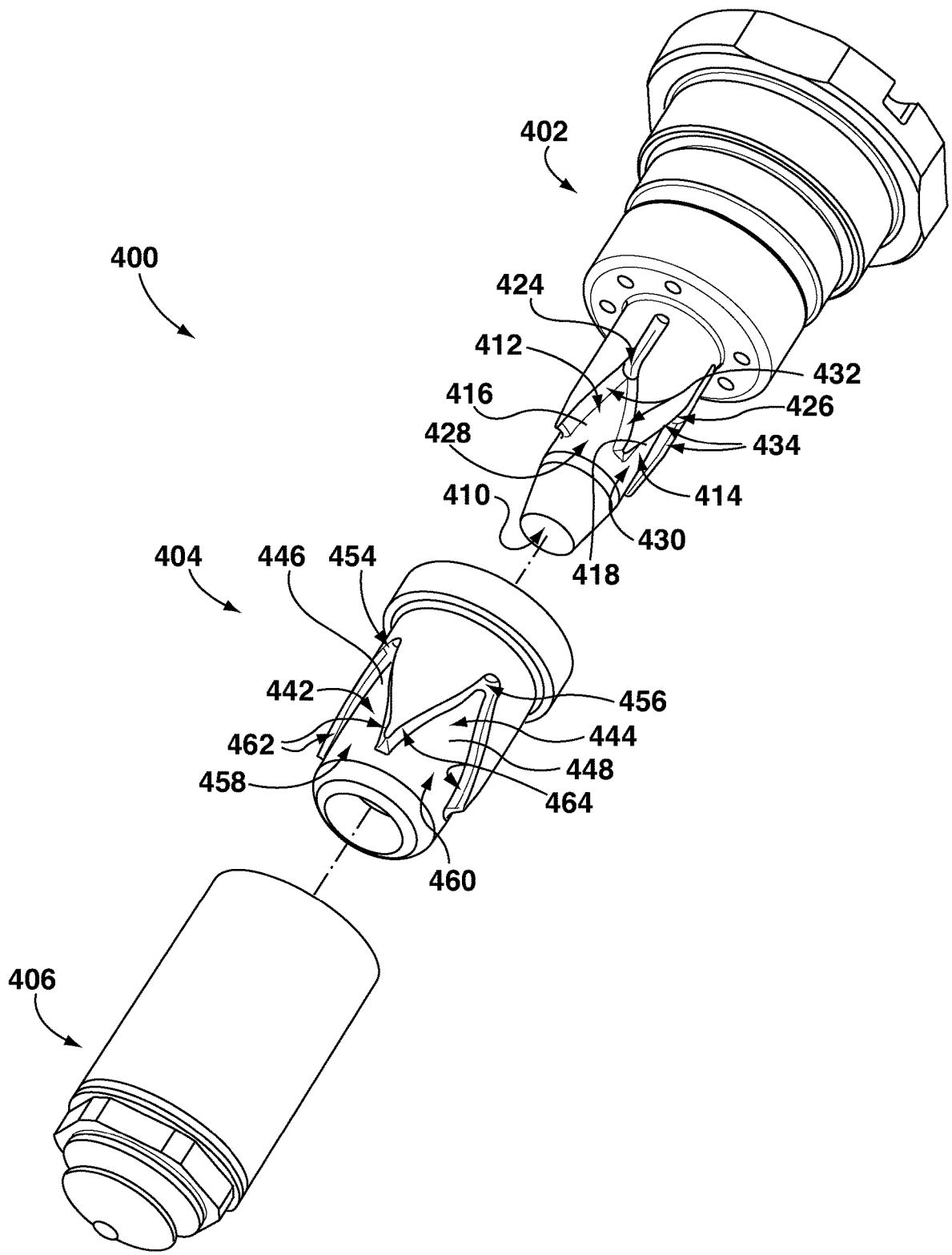
FIG. 16 is an exploded view of an apparatus for flowing melted molding material.

FIG. 16 is an exploded view of an exemplary apparatus 400 that could be used to define flow transition channels having any of the various channel geometries described above. The illustrated apparatus 400 is configured to flow melted molding material in multiple annular layers. This is not necessarily true for all embodiments. The apparatus 400 may be a hot runner nozzle and may be used in a co-injection context for example.

As illustrated, the apparatus 400 has three component parts: a housing 402, an insert 404 that fits over a head portion 405 of the housing 402, and a tip 406 that fits over the insert 404. The assembled components 402, 404 and 406 may be considered to collectively form a nozzle body.

The housing comprises an inner channel structure 410 that defines an inner flow, which is non-annular in this embodiment. The inner channel structure may comprise a cylindrical passage.

The housing 402 and the insert 404 cooperate to define a plurality of intermediate flow transition channels arranged in a ring. The number of intermediate flow transition channels in this example is four, but may vary in alternative embodiments.

An inner portion of each of two intermediate flow transition channels 412 and 414 is visible in FIG. 16. Two generally triangular regions 416 and 418 of a curved external face of the housing 402 form the concave inner walls of the channels 412 and 414 respectively. It will be appreciated that the regions 416 and 418 may incorporate outwardly protruding obstructing features, like obstructing feature 251 of FIGS. 9-12, or may be otherwise shaped to define areas of reduced channel thickness, such as areas or reduced channel thickness 249 and 349 described above, in some embodiments. Portions of an inner wall of the insert 404, which is not visible in FIG. 16, define the outer walls of flow transition channels 412 and 414.

Each of the intermediate flow transition channels 412, 414 has a tubular inlet 424, 426, an outlet 428, 430 with a part-annulus shape, and a pair 432, 434 of opposing side walls that flare away from one another in the downstream direction, respectively.

The insert 404 and tip 406 similarly cooperate to define a plurality of outer flow transition channels arranged in a ring. The number of outer flow transition channels in this example is also four, but may vary in alternative embodiments.

An inner portion of each of two outer flow transition channels 442 and 444 is visible in FIG. 14. Two generally triangular regions 446 and 448 of a curved external face of the insert 404 form the concave inner walls of the channels 442 and 444 respectively. It will be appreciated that the regions 446 and 448 may incorporate outwardly protruding obstructing features, like obstructing feature 251 of FIGS. 9-12, or may otherwise be shaped to define areas of reduced channel thickness, such as areas of reduced channel thickness 249 and 349 described above, in some embodiments. Portions of an inner wall of the tip 406, which is not visible in FIG. 16, define the outer walls of flow transition channels 442 and 444. Each of the outer flow transition channels 442, 444 has a tubular inlet 454, 456, an outlet 458, 460 with a part-annulus shape, and a pair 462, 464 of opposing side walls that flare away from one another in the downstream direction, respectively.

The housing 402 and insert 404 may collectively be considered to comprise an intermediate channel structure that is configured to define the intermediate annular flow. Similarly, the insert 404 and tip 406 may collectively be considered to comprise an outer channel structure that is configured to define the outer annular flow. Both of these channel structures could have different shapes or forms in alternative embodiments (e.g. they could be made as a unitary component using additive engineering).

It will be appreciated that the number of flow transition channels used to form an annular flow may vary between embodiments, but will be at least two. In some embodiments, the number may be chosen based on an outer diameter of the desired annular flow. In particular, the larger the outer diameter of the annular flow, the greater the number of flow transition channels that may be used. This may facilitate adoption of a suitable height to width (arc length) ratio for each of the flow transition channels, as discussed above.

It will be appreciated that any of the various channel geometry aspects (e.g. decreasing channel thickness, incorporation of an area of reduced channel thickness along the width of the channel, adoption of a particular height to arc length ratio) that are described above as promoting at least one of a uniform flow velocity and a uniform temperature profile across a part-annular flow of melted molding material may be employed in a particular flow transition channel design, either independently or in combination with one or more of the other channel geometry aspects described above.

Regardless of whether an apparatus is formed as a unitary component, e.g. using additive manufacturing, or from multiple components that are assembled to form a whole, the structure forming the unitary or whole apparatus may be considered to constitute an apparatus body. If the apparatus is a nozzle, then the body may be referred to as a nozzle body. If the apparatus is a manifold bushing, then the body may be referred to as a bushing body.

One embodiment of an apparatus for flowing melted molding material may comprise an apparatus body, a channel in the apparatus body having a tubular inlet, an outlet with a part-annulus shape, a pair of opposing side walls that flare away from one another in a downstream direction, and an obstructing feature configured to cause a melt flow to spread out from a center of the channel towards the side walls.

Various alternative embodiments are possible.

In the embodiments described above, flow transition channels are used to produce flows that are quarter-annular. It will be appreciated that other embodiments of flow transition channels may produce flows of other sizes (e.g. half-annular, one-third-annular, one-fifth-annular, etc.).

Although the above embodiments describe the use of channel geometries for promoting a uniform velocity profile across annular melt flows, it will be appreciated that the same channel geometries could be used for promoting a uniform velocity profile across semi-annular melt flows that do not form part of an annular flow.

In some embodiments of a hot runner nozzle having a housing component similar to housing 402 of FIG. 16, a head portion of the housing component, similar to head portion 405 of FIG. 16, may be removable from the remainder of the housing component, e.g. for ease of assembly and/or service.

In each of the flow transition channel embodiments described above having an area of reduced channel thickness, the area of reduced channel thickness is centered between the side walls of the flow transition channel. This "widthwise" or transverse centering may be adopted because the inbound melt flow that the area of reduced chancel thickness intended to spread out laterally is itself centered between the side walls. For example, the inbound melt flow may be received from an inlet that is centered with respect to the part-annular channel outlet. However, it is not necessarily true that all area of reduced channel thickness are necessarily centered between the side walls of all embodiments. For example, if an inbound melt flow is laterally off-center within a flow transition channel, then the area of reduced channel thickness may be similarly off-center. This is illustrated in FIGS. 17 and 18.

Figure 17:
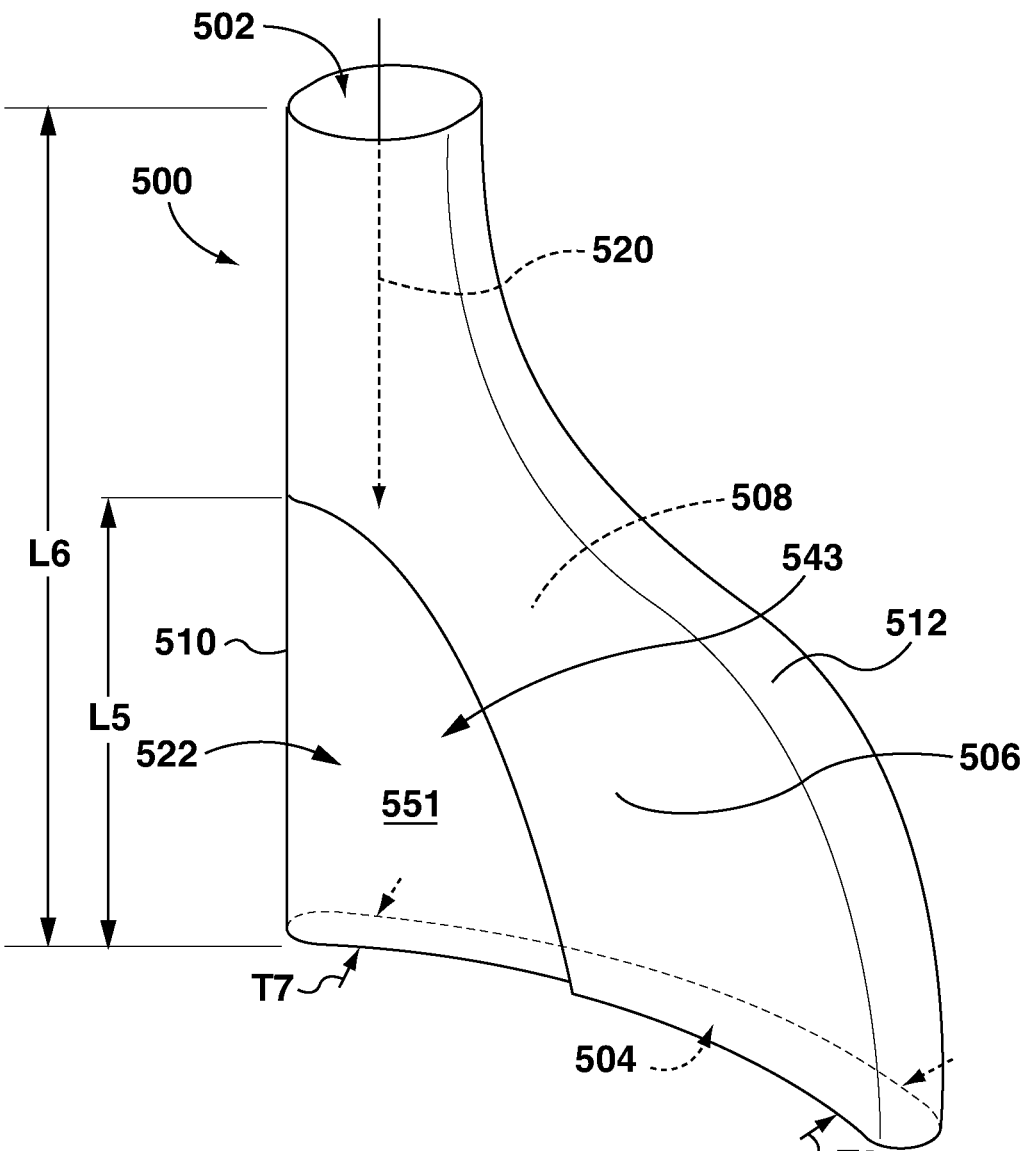
FIG. 17 is a perspective view of an alternative flow transition channel from a further alternative embodiment of apparatus for flowing melted molding material.
Figure 18:
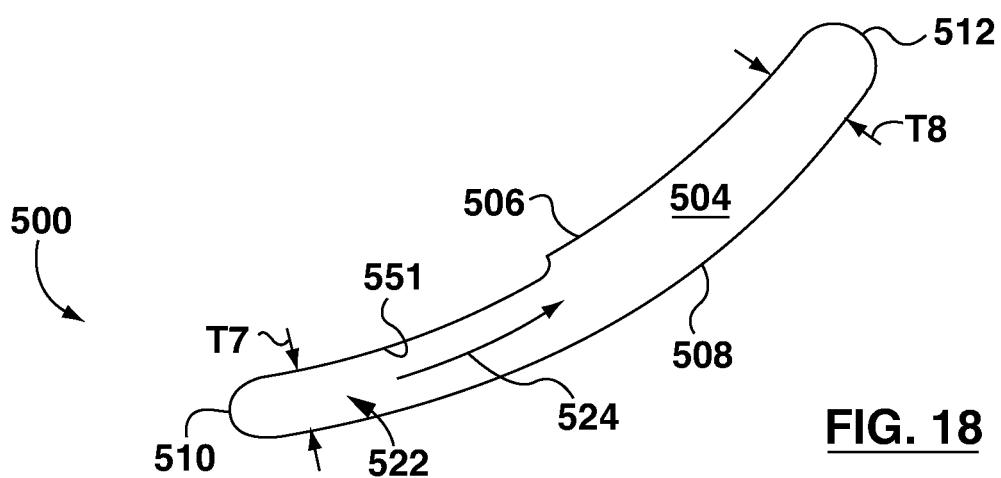
FIG. 18 is a bottom view of the flow transition channel of FIG. 17.

Referring to those figures, FIGS. 17 and 18 illustrate an example flow transition channel 500 in perspective and bottom view, respectively. The flow transition channel 500 has a tubular inlet 502 and a part-annular shaped outlet 504. The flow transition channel further has a convex inner wall 506, a concave outer wall 508 and a pair of narrow opposing side walls 510, 512. One of the side walls 510 is substantially straight, while the other side wall 512 diverges from the straight wall 510 in the downstream direction and has an ogee shape. The ogee shape is optional.

The flow transition channel 500 may be one of a plurality of like flow transition channels arranged in a ring within a body of an apparatus such as a hot runner nozzle (e.g. as depicted in FIGS. 1 and 2) or manifold bushing for example. The ring of flow transition channels may be designed to collectively producing an annular melt flow.

During use, the flow transition channel 500 receives an inbound melt flow from inlet 502. In view of the offset position of the inlet 502 and a possibly in view of a shaping of an immediately upstream channel (which may be straight), the inbound melt flow may, at least initially, tend to travel along a longitudinal trajectory 520 adjacent to side wall 510.

To resist a tendency of this melt flow to proceed primarily or exclusively along this trajectory 520 and exit outlet 504 with a higher velocity than melt exiting elsewhere from the outlet 504, the flow transition channel includes an area of reduced channel thickness 522 near side wall 510, in a downstream section 543 of the channel 500.

In the present embodiment, the area of reduced channel thickness 522 is formed by an obstructing feature 551, in the downstream section 543 of the channel 500, that protrudes from wall 506 into the channel 500. The obstructing feature 551 (and thus the area of reduced channel thickness 522) is transversely aligned with the inlet 502. The feature 551 and area 522 are thus transversely off-center between opposing side walls 510 and 512 in the present embodiment.

The obstructing feature 551 of the present embodiment has a generally triangular, rounded triangle or sail-like shape, with the narrowest portion of the triangle being upstream-most (see e.g. FIG. 17). As such, the example obstructing feature 551 widens in the downstream direction. This is not necessarily true for all embodiments, which may incorporate obstructing features of different shapes.

The thickness T7 of flow transition channel 500 at outlet 504 in the area of reduced channel thickness 522 is smaller than a thickness T8 of the flow transition channel elsewhere at outlet 504. The flow transition channel 500 accordingly has a non-uniform transverse cross-sectional channel thickness, as well as a non-uniform longitudinal cross-sectional thickness.

It will be appreciated that the area of reduced channel thickness 522 has a longitudinal (downstream) extent or length L5 that is less than (here, approximately 50%) an overall longitudinal extent or length L6 of the flow transition channel 326 in the illustrated embodiment. The relative lengths of these features may differ in other embodiments.

In operation, the area of reduced channel thickness 522 may urge the inbound melt stream to spread laterally within the channel, and specifically in a direction from side wall 510 towards side wall 512 as depicted by arrow 524 in FIG. 16. The area of reduced channel thickness 522 may achieve this result by creating a pressure gradient within the channel 500 in which pressure is highest at the inbound melt flow in the area of reduced channel thickness 522 near side wall 510 and lower elsewhere within the channel 500. This may encourage the melt to flow laterally or transversely as depicted by arrow 524 (FIG. 18), which may in turn promote a uniform velocity profile of melt across the part-annular outlet 504.

The melt flowing through the area of reduced channel thickness 522 may experience greater shear heating effects from obstructing feature 551 and wall 508 than melt flowing around (outside of) the area of reduced channel thickness 522 may experience from walls 506 and 508, as the latter are farther apart. The shape of the obstructing feature 551 may be chosen so that the degree of this greater shear heating in area 522 is similar to the degree of greater shear-heating of melt flowing along the longer side wall 512 as compared to shorter side wall 510. The area of reduced channel thickness 522 may thus improve a uniformity of a temperature across the part-annular outlet 504 in view of the dissimilar lengths of side walls 510 and 512. As such, the area of reduced channel thickness 522 may not only promote a uniform melt velocity profile but also a uniform melt temperature profile across the part-annular channel outlet 504.

The shape and placement of the area 522 may vary between embodiments, e.g. depending upon an anticipated temperature profile of melt entering inlet 502, which may be asymmetric depending upon such factors as upstream channel geometry. Computational fluid dynamics modeling software (e.g. SolidWorks™, ANSYS CFD™ or the like) may help to determine the anticipated temperature profile of inflowing melt. In one example, the area of reduced channel thickness may be placed so that the anticipated coolest areas of melt will pass by the longest (in the downstream direction) portion, or the thinnest portion, of the area of reduced channel thickness 522.

It will be appreciated that any of flow transition channels 226, 326 and 500 could be defined within an apparatus like apparatus 100 of FIG. 1 in place of any or all of flow transition channels 120, 122, 124 and 126.

At least some of the flow transition channel embodiments discussed above depict an area of reduced channel thickness that is transversely aligned with the inlet of the flow transition channel. It will be appreciated that, in some embodiments having such an area of reduced channel thickness, the area of reduced channel thickness may be slightly offset or not aligned with the inlet. This misalignment may be in view of an anticipated non-uniform temperature profile of a melt stream entering the inlet, e.g. due to upstream channel geometry. For example, the area of reduced channel thickness may be transversely shifted towards an anticipated coolest area of inflowing melt.

The following clauses provide a further description of example apparatuses:

(1) A hot runner nozzle comprising:
a nozzle body;
an annular outlet channel in the nozzle body;
a source channel upstream of the annular outlet channel in the nozzle body;
a flow transition channel in the nozzle body interconnecting the source channel with a segment of the annular outlet channel, the flow transition channel widening in a downstream direction and having a curved transverse cross section, wherein a thickness of the flow transition channel decreases in the downstream direction.

(2) The hot runner nozzle of clause (1) wherein the flow transition channel is shaped to provide a consistent transverse cross-sectional area over a longitudinal extent, of decreasing thickness, of the flow transition channel.

(3) The hot runner nozzle of clause (1) or clause (2) wherein the flow transition channel is defined by a pair of opposing side walls having respective ogee shapes.

(4) The hot runner nozzle of clause (3) wherein the curved transverse cross section has a part-annulus shape and wherein the opposing side walls of the transverse cross section are normal to a notional annulus of which the part-annulus shape is a part.

(5) The hot runner nozzle of any one of clauses (1) to (4) wherein the flow transition channel is a first flow transition channel of a plurality of like flow transition channels in the nozzle body, the plurality of flow transition channels being arranged in a ring for collectively defining an annular melt flow for supplying the annular outlet channel.

(6) The hot runner nozzle of any one of clauses (1) to (5) wherein a cross-sectional thickness or cross-sectional area of the annular outlet channel decreases in the downstream direction.

(7) An apparatus for flowing melted molding material, comprising:
an apparatus body;
a channel in the apparatus body having an inlet, an outlet with a part-annulus shape, and a pair of opposing side walls that diverge in a downstream direction, wherein a thickness of the channel decreases in the downstream direction.

(8) The apparatus of clause (7) wherein the channel is shaped to provide a consistent transverse cross-sectional area over a longitudinal extent, of decreasing thickness, of the channel.

(9) The apparatus of clause (7) or clause (8) wherein the opposing side walls have respective ogee shapes.

(10) The apparatus of any one of clauses (7) to (9) wherein a transverse cross section of the channel has a part-annulus shape and wherein the opposing side walls of the transverse cross section are normal to a notional annulus of which the part-annulus shape is a part.

(11) The apparatus of any one of clauses (7) to (10) wherein the channel is a first channel of a plurality of like channels in the apparatus body, the plurality of channels being arranged in a ring for collectively defining an annular flow of the melted molding material.

(12) The apparatus of any one of clauses (7) to (11) wherein the apparatus is a nozzle.

(13) The apparatus of any one of clauses (7) to (11) wherein the apparatus is a manifold bushing.

(14) A hot runner nozzle for flowing melted molding material, comprising:
a nozzle body;
an annular outlet channel in the nozzle body;
a source channel upstream of the annular outlet channel in the nozzle body;
a flow transition channel in the nozzle body interconnecting the source channel with a segment of the annular outlet channel, the flow transition channel widening in a downstream direction, the flow transition channel having a curved transverse cross section and an obstructing feature, the obstructing feature configured to obstruct a flow of the melted molding material from the source channel to cause the flow to spread widthwise within the flow transition channel.

(15) The hot runner nozzle of clause (14) wherein the obstructing feature comprises a constriction in the flow transition channel.

(16) The hot runner nozzle of clause (14) or clause (15) wherein the obstructing feature is centered widthwise in the flow transition channel.

(17) The hot runner nozzle of clause (16) wherein the constriction has a uniform thickness over a central widthwise extent of the flow transition channel.

(18) The hot runner nozzle of any one of clauses (14) to (17) wherein the obstructing feature widens in the downstream direction.

(19) The hot runner nozzle of any one of clauses (14) to (18) wherein the flow transition channel is defined by a pair of opposing side walls having respective ogee shapes.

(20) The hot runner nozzle of any one of clauses (14) to (19) wherein a cross-sectional thickness or cross-sectional area of the annular outlet channel decreases in the downstream direction.

(21) The hot runner nozzle of any one of clauses (14) to (20) wherein the channel is a first channel of a plurality of like channels in the nozzle body, the plurality of channels being arranged in a ring for collectively defining an annular flow of the melted molding material for supplying the annular outlet channel.

(22) An apparatus for flowing melted molding material, comprising:
an apparatus body;
a channel in the apparatus body having an inlet, an outlet with a part-annulus shape, a pair of opposing side walls that diverge in a downstream direction, and an obstructing feature configured to obstruct a flow of the melted molding material from the inlet to cause the flow to spread laterally between the side walls.

(23) The apparatus of clause (22) wherein the obstructing feature comprises a constriction in the channel.

(24) The apparatus of clause (22) or clause (23) wherein the obstructing feature is off-center between the side walls.

(25) The apparatus of clause (22) or clause (23) wherein the obstructing feature is centered between the side walls.

(26) The apparatus of clause (25) wherein the constriction comprises a constricted thickness of the channel that is uniform over a central widthwise extent of the channel.

(27) The apparatus of any one of clauses (22) to (26) wherein the obstructing feature widens in the downstream direction.

(28) The apparatus of any one of clauses (22) to (27) wherein the opposing side walls have respective ogee shapes.

(29) The apparatus of any one of clauses (22) to (28) wherein the channel is a first channel of a plurality of like channels in the apparatus body, the plurality of channels being arranged in a ring for collectively defining an annular flow of the melted molding material.

(30) The apparatus any one of clauses (22) to (29) wherein the apparatus is a nozzle.

(31) The apparatus any one of clauses (22) to (29) wherein the apparatus is a manifold bushing.

(32) An apparatus for flowing melted molding material, comprising:
an apparatus body;
a channel in the apparatus body having an inlet, a pair of opposing side walls that diverge in a downstream direction, and an outlet with a part-annulus shape, the channel having a longitudinal extent that is about 1.5 times the extent of an arc spanned by the outlet.

(33) The apparatus of clause (32) wherein the arc is between a convex side of the outlet and a concave side of the outlet.

(34) The apparatus of clause (32) or clause (33) wherein the opposing side walls have respective ogee shapes.

(35) The apparatus of any one of clauses (32) to (34) wherein the channel is a first channel of a plurality of like channels in the apparatus body, the plurality of channels being arranged in a ring for collectively defining an annular flow of the melted molding material.

(36) The apparatus any one of clauses (32) to (35) wherein the apparatus is a nozzle.

(37) The apparatus any one of clauses (32) to (35) wherein the apparatus is a manifold bushing.

(38) An apparatus for flowing melted molding material in multiple annular layers, comprising:
an inner channel structure configured to define an inner flow;
an outer channel structure configured to define an outer annular flow about the inner flow; and
an intermediate channel structure configured to define an intermediate flow between the inner flow and outer annular flow,
wherein the outer channel structure includes a plurality of outer flow transition channels arranged in a ring for collectively defining the outer annular flow, each of the outer flow transition channels having an inlet, an outlet with a part-annulus shape, and a pair of opposing side walls that diverge in a downstream direction, and
wherein the intermediate channel structure includes a plurality of intermediate flow transition channels arranged in a ring for collectively defining the intermediate annular flow, each intermediate flow transition channel having an inlet, an outlet with a part-annulus shape, and a pair of opposing side walls that diverge in the downstream direction.

(39) The apparatus of clause (38) comprising a housing, an insert that fits over the housing, and a tip that fits over the insert, wherein the housing defines the inner channel structure and cooperates with the insert to collectively define the intermediate channel structure, and wherein the insert cooperates with the tip to collectively define the outer channel structure.

(40) The apparatus of clause (38) or clause (39) wherein a thickness of each of the outer flow transition channels decreases in the downstream direction.

(41) The apparatus of clause (38) or clause (39) wherein a thickness of each of the intermediate flow transition channels decreases in the downstream direction.

(42) The apparatus of clause (38) or clause (39) wherein each of the outer flow transition channels comprises an obstructing feature configured to cause a flow of the melted molding material from the inlet of the outer flow transition channel to spread out between the side walls of the outer flow transition channel.

(43) The apparatus of clause (38) or clause (39) wherein each of the intermediate flow transition channels comprises an obstructing feature configured to cause a flow of the melted molding material from the inlet of the intermediate flow transition channel to spread out between the side walls of the intermediate flow transition channel.

(44) The apparatus of clause (38) or clause (39) wherein each of the outer flow transition channels has a longitudinal extent that is about 1.5 times the extent of an arc spanned by the outlet of the outer flow transition channel.

(45) The apparatus of clause (38) or clause (39) wherein each of the intermediate flow transition channels has a longitudinal extent that is about 1.5 times the extent of an arc spanned by the outlet of the intermediate flow transition channel.

(46) An apparatus for flowing melted molding material in multiple annular layers, comprising:
a housing;
an insert that fits over the housing; and
a tip that fits over the insert,
wherein the housing defines an inner flow;
wherein the insert and the tip cooperate to define a plurality of outer flow transition channels arranged in a ring, the plurality of flow transition channels collectively defining an outer annular flow about the inner flow, each of the outer flow transition channels having an inlet, an outlet with a part-annulus shape, and a pair of opposing side walls that diverges in a downstream direction; and
wherein the housing and the insert cooperate to define a plurality of intermediate flow transition channels arranged in a ring for collectively defining an intermediate annular flow between the inner flow and outer annular flow, each intermediate flow transition channel having an inlet, an outlet with a part-annulus shape, and a pair of opposing side walls that diverges in the downstream direction.

(47) An apparatus for flowing melted molding material, comprising:
an apparatus body;
a channel in the apparatus body having an inlet, an outlet with a part-annulus shape, a pair of opposing side walls that diverge in a downstream direction, and a non-uniform transverse cross-sectional channel thickness.

(48) The apparatus of clause (47) wherein the non-uniform transverse cross-sectional channel thickness is in a downstream section of the channel.

(49) The apparatus of clause (47) or claim 48) wherein the non-uniform transverse cross-sectional thickness is at least partly defined by an area of reduced channel thickness that is aligned with the inlet of the channel.

(50) The apparatus of clause (49) wherein the area of reduced channel thickness has a length, in the downstream direction, of about one-third a length of the channel.

(51) The apparatus of clause (49) or claim 50) wherein the area of reduced channel thickness is centered between the opposing side walls.

(52) The apparatus of clause (49) or claim 50) wherein the area of reduced channel thickness is transversely off-center within the channel.

(53) The apparatus of any one of clauses (49) to (52) wherein a thickness of the channel, in the area of reduced channel thickness, is uniform over a central widthwise extent of the channel.

(54) The apparatus of any one of clauses (49) to (53) wherein the area of reduced channel thickness is at least partly defined by an obstructing feature within the channel for obstructing a flow of melted molding material through the channel.

(55) The apparatus of clause (54) wherein the obstructing feature widens in the downstream direction.

(56) The apparatus of clause (55) wherein the obstructing feature is substantially triangular.

(57) The apparatus of any one of clauses (47) to (56) wherein the channel is a first channel of a plurality of like channels in the apparatus body, the plurality of like channels being arranged in a ring for collectively defining an annular flow of the melted molding material.

(58) The apparatus of any one of clauses (47) to (57) wherein the apparatus is a nozzle.

(59) The apparatus of any one of clauses (47) to (57) wherein the apparatus is a manifold bushing.

(60) An apparatus for flowing melted molding material in multiple annular layers, comprising:
a housing;
an insert that fits over the housing; and
a tip that fits over the insert,
wherein the housing defines an inner flow;
wherein the insert and the tip cooperate to define a plurality of outer flow transition channels arranged in a ring, the plurality of flow transition channels collectively defining an outer annular flow about the inner flow, each of the outer flow transition channels having an inlet, an outlet with a part-annulus shape, a pair of opposing side walls that diverges in a downstream direction, and a non-uniform transverse cross-sectional channel thickness; and
wherein the housing and the insert cooperate to define a plurality of intermediate flow transition channels arranged in a ring for collectively defining an intermediate annular flow between the inner flow and outer annular flow, each intermediate flow transition channel having an inlet, an outlet with a part-annulus shape, a pair of opposing side walls that diverges in the downstream direction, and a non-uniform transverse cross-sectional channel thickness.

Other modifications may be made within the scope of the following claims.

What is claimed is:
1. A hot runner nozzle comprising:
a nozzle body;
an annular outlet channel in the nozzle body;
a source channel upstream of the annular outlet channel in the nozzle body; and
a flow transition channel in the nozzle body interconnecting the source channel with a part-annular segment of the annular outlet channel, the flow transition channel having a curved inner wall, a curved outer wall, and a pair of opposing narrow sidewalls diverging in a downstream direction, the flow transition channel having a non-uniform cross-sectional channel thickness in at least one of a longitudinal direction and a transverse direction, the channel thickness being a distance between the curved inner wall and the curved outer wall of the flow transition channel.

2. The hot runner nozzle of claim 1 wherein the non-uniform cross-sectional channel thickness comprises a non-uniform longitudinal cross-sectional channel thickness.

3. The hot runner nozzle of claim 2 wherein the non-uniform longitudinal channel thickness progressively decreases in the downstream direction, from an input thickness to an output thickness.

4. The hot runner nozzle of claim 1 wherein the non-uniform cross-sectional channel thickness comprises a non-uniform transverse cross-sectional channel thickness.

5. The hot runner nozzle of claim 4 wherein the non-uniform transverse channel thickness progressively increases, in the transverse direction, from a central thickness to a peripheral thickness.

6. The hot runner nozzle of claim 4 wherein the non-uniform transverse cross-sectional channel thickness is in a downstream section of the flow transition channel at or near an outlet of the flow transition channel.

7. The hot runner nozzle of claim 4 wherein the non-uniform transverse cross-sectional thickness is at least partly defined by an area of reduced channel thickness that is transversely aligned with the source channel.

8. The hot runner nozzle of claim 7 wherein the area of reduced channel thickness has a length, in the downstream direction, of about one-third of a length of the flow transition channel in the downstream direction.

9. The hot runner nozzle of claim 7 wherein the area of reduced channel thickness is transversely centered within the flow transition channel.

10. The hot runner nozzle of claim 7 wherein the area of reduced channel thickness is transversely off-center within the flow transition channel.

11. The hot runner nozzle of claim 7 wherein a thickness of the flow transition channel, in the area of reduced channel thickness, is uniform over a central widthwise extent of the channel.

12. The hot runner nozzle of claim 7 wherein the area of reduced channel thickness is at least partly defined by an obstructing feature within the flow transition channel for obstructing a flow of melted molding material through the flow transition channel.

13. The hot runner nozzle of claim 12 wherein the obstructing feature widens in the downstream direction.

14. The hot runner nozzle of claim 13 wherein the obstructing feature is substantially triangular.

15. The hot runner nozzle of claim 1 wherein the pair of opposing narrow side walls has respective ogee shapes.

16. The hot runner nozzle of claim 1 wherein the flow transition channel is a first flow transition channel of a plurality of like flow transition channels in the nozzle body, the plurality of flow transition channels being arranged in a ring for collectively defining an annular melt flow for supplying the annular outlet channel.

17. The hot runner nozzle of claim 16 wherein annular melt flow is an intermediate annular melt flow and wherein the nozzle body comprises:
an inner channel structure configured to define an inner flow;
an outer channel structure configured to define an outer annular flow about the inner flow; and
an intermediate channel structure configured to define the intermediate annular flow between the inner flow and outer annular flow.

18. The hot runner nozzle of claim 17 further comprising: a housing, an insert that fits over the housing, and a tip that fits over the insert, wherein the housing defines the inner channel structure and cooperates with the insert to collectively define the intermediate channel structure, and wherein the insert cooperates with the tip to collectively define the outer channel structure.

\* \* \* \* \*